United States Patent
Tamakoshi et al.

(10) Patent No.: US 12,325,599 B2
(45) Date of Patent: Jun. 10, 2025

(54) CONVEYING DEVICE AND ANALYSIS SYSTEM

(71) Applicant: Hitachi High-Tech Corporation, Tokyo (JP)

(72) Inventors: Takeshi Tamakoshi, Tokyo (JP); Yasuaki Aoyama, Tokyo (JP); Satoru Kaneko, Tokyo (JP); Hiroyuki Kobayashi, Tokyo (JP); Ryosuke Hoshi, Tokyo (JP); Hiroshi Watanabe, Tokyo (JP); Katsuhiro Kambara, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 728 days.

(21) Appl. No.: 17/761,845

(22) PCT Filed: Sep. 7, 2020

(86) PCT No.: PCT/JP2020/033809
§ 371 (c)(1),
(2) Date: Mar. 18, 2022

(87) PCT Pub. No.: WO2021/065362
PCT Pub. Date: Apr. 8, 2021

(65) Prior Publication Data
US 2022/0274792 A1    Sep. 1, 2022

(30) Foreign Application Priority Data
Oct. 1, 2019 (JP) ................ 2019-181674

(51) Int. Cl.
B65G 54/02    (2006.01)
G01N 35/04   (2006.01)
H02P 25/06    (2016.01)

(52) U.S. Cl.
CPC ............. B65G 54/02 (2013.01); G01N 35/04 (2013.01); *B65G 2203/0233* (2013.01);
(Continued)

(58) Field of Classification Search
CPC .............. B65G 4/02; B65G 2203/0233; B65G 2203/0266; G01N 35/04; G05N 2035/0477; H02P 25/06
See application file for complete search history.

(56) References Cited

U.S. PATENT DOCUMENTS 6,080,364 A    6/2000  Mimura et al.
6,191,507 B1 *  2/2001  Peltier ................ B65G 54/02
                                                              318/135
(Continued)

FOREIGN PATENT DOCUMENTS

EP    2977766 A1    1/2016
JP    2008-46144 A    2/2008
(Continued)

OTHER PUBLICATIONS

Extended European Search Report issued on Sep. 19, 2023 for European Patent Application No. 20870462.7.

*Primary Examiner* — Kyle O Logan
(74) *Attorney, Agent, or Firm* — Volpe Koenig

(57) ABSTRACT

A conveying device conveys a container including a magnetic body to a target position along a conveyance path and includes a conveyance surface configured by arranging a plurality of magnetic poles including a core and a coil, and including a conveyance path, a drive unit supplying a current to the coil, and a position detection unit estimating the position of the container. The position detection unit excites a first magnetic pole to detect the position of the container and applies a voltage to at least one second magnetic pole that is peripheral in a predetermined range from the first magnetic pole and is different from the first magnetic pole in (Continued)

a direction in which the polarity becomes opposite to the exciting current of the first magnetic pole, and a process of estimating the position of the container based on the current value of the first magnetic pole.

10 Claims, 15 Drawing Sheets

(52) U.S. Cl.
CPC ............... *B65G 2203/0266* (2013.01); *G01N 2035/0477* (2013.01); *H02P 25/06* (2013.01)

(56) References Cited

U.S. PATENT DOCUMENTS

| | | | | |
|---|---|---|---|---|
| 7,597,187 B2* | 10/2009 | Bausenwein | ........... | B41F 13/00 |
| | | | | 198/619 |
| 9,187,268 B2* | 11/2015 | Denninger | ............. | G01N 35/04 |
| 9,239,335 B2* | 1/2016 | Heise | ....... | G01N 35/04 |
| 9,618,525 B2* | 4/2017 | Malinowski | ........... | G01N 35/04 |
| 9,902,572 B2* | 2/2018 | Mahmudimanesh | .. | G01N 35/04 |
| 10,197,586 B2* | 2/2019 | Sinz | ........................ | G01N 35/04 |
| 2014/0234065 A1 | 8/2014 | Heise et al. | | |
| 2016/0069715 A1* | 3/2016 | Sinz | ........................ | G01N 35/00 |
| | | | | 324/202 |
| 2016/0268883 A1 | 9/2016 | Kakihara et al. | | |
| 2017/0131310 A1* | 5/2017 | Volz | ........................ | G01N 35/04 |
| 2017/0184622 A1 | 6/2017 | Sinz et al. | | |
| 2017/0363608 A1* | 12/2017 | Sinz | ........................ | G01N 35/04 |
| 2018/0188280 A1* | 7/2018 | Malinowski | .......... | H01F 7/0205 |
| 2023/0207364 A1* | 6/2023 | Jin | .................... | H01L 21/67736 |
| | | | | 700/229 |
| 2024/0067467 A1* | 2/2024 | Tamakoshi | ............. | B65G 54/02 |

FOREIGN PATENT DOCUMENTS

| | | |
|---|---|---|
| JP | 2009-131133 A | 6/2009 |
| JP | 2009-238966 A | 10/2009 |
| JP | 2016-171669 A | 9/2016 |
| JP | 6072052 B2 | 2/2017 |
| JP | 2017-527815 A | 9/2017 |
| WO | 2013/064656 A1 | 5/2013 |

* cited by examiner

[Fig. 1]
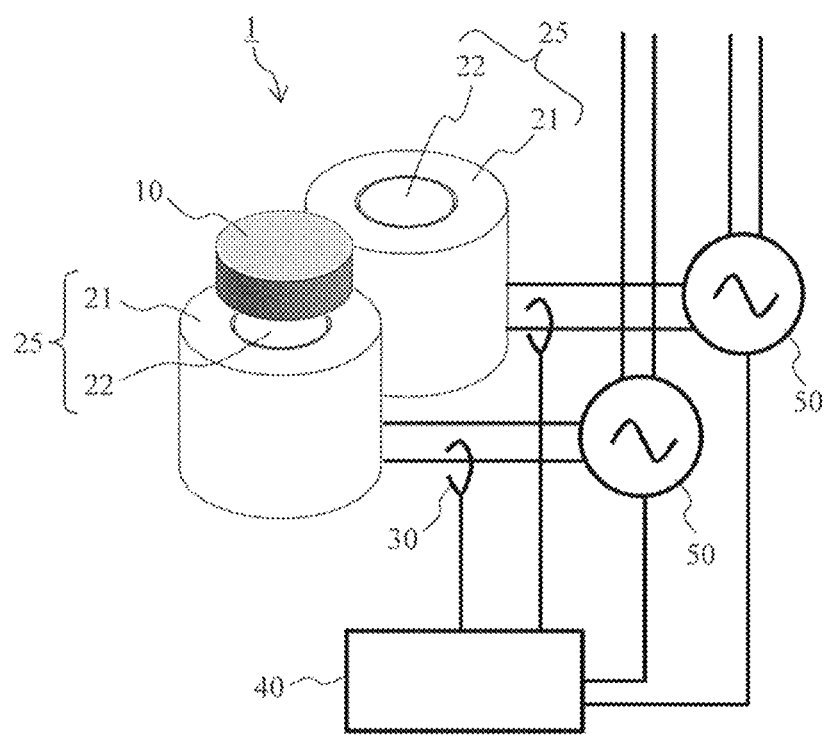

[FIG. 2]
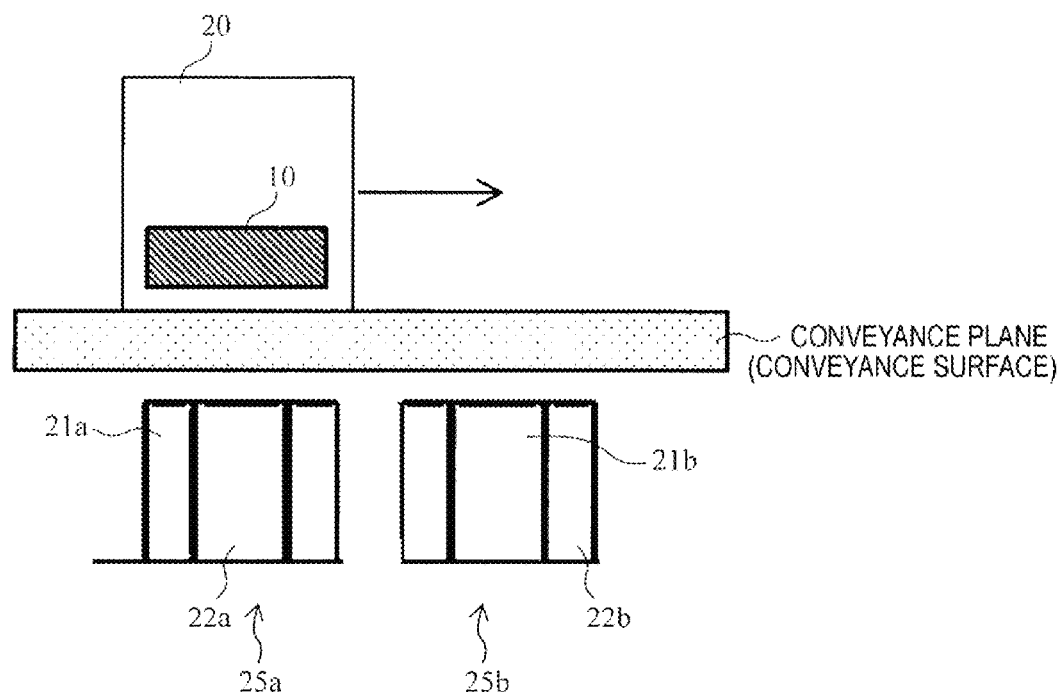

[FIG. 4]
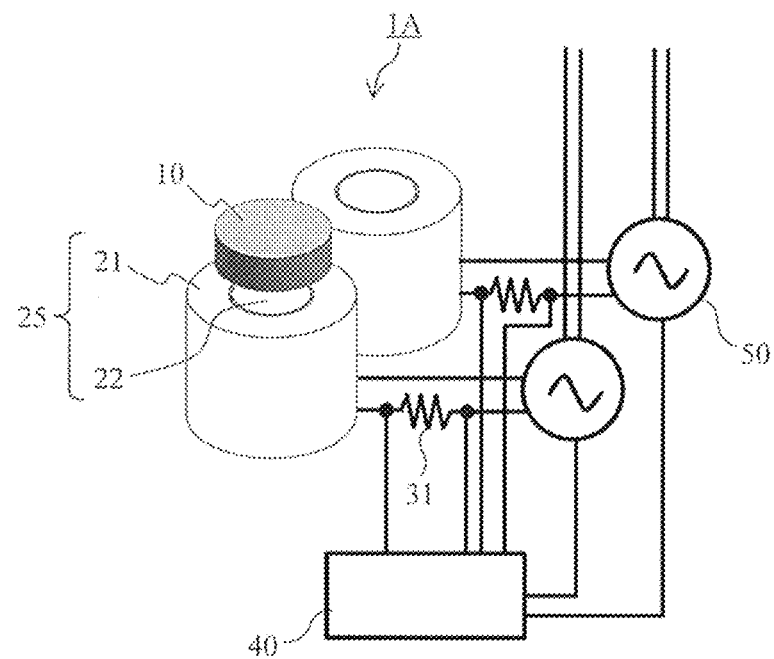

[FIG. 5]
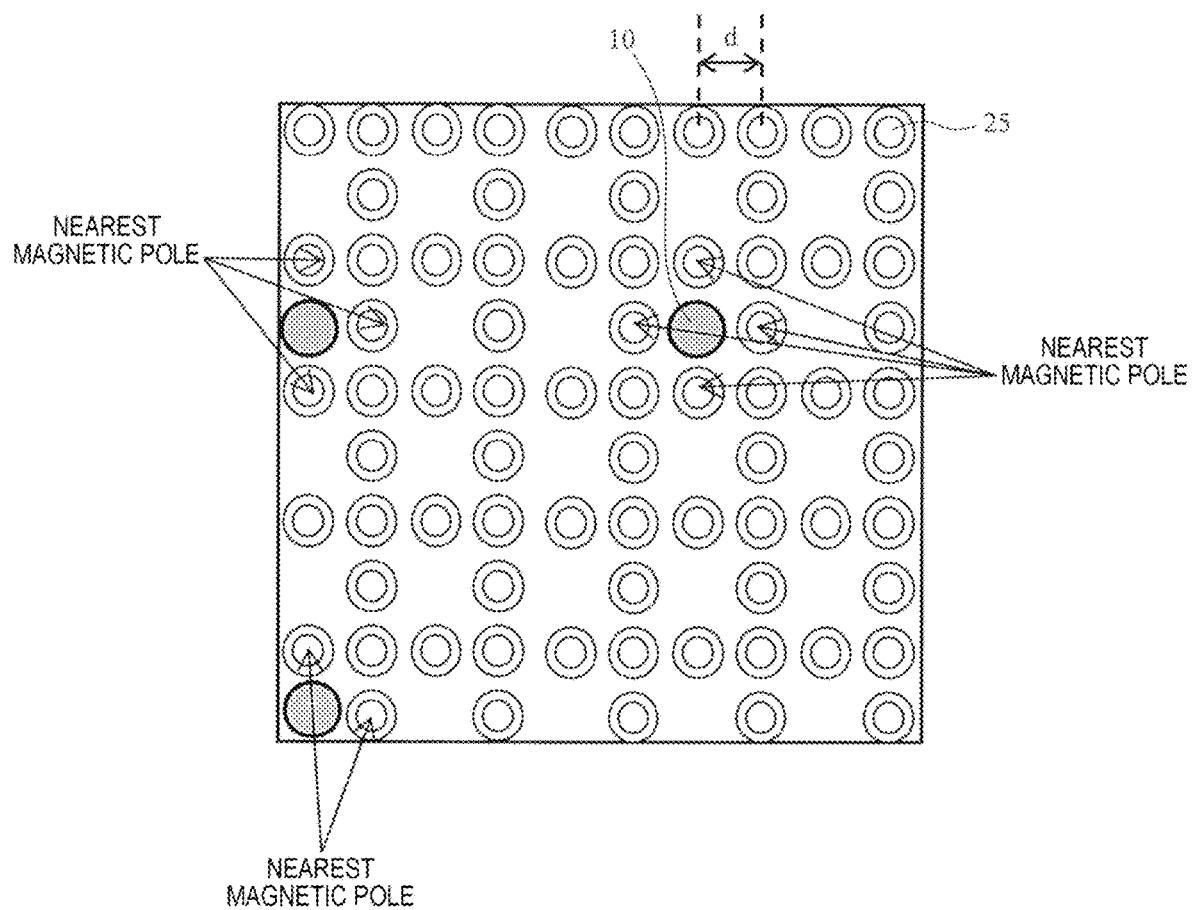

[FIG. 7]
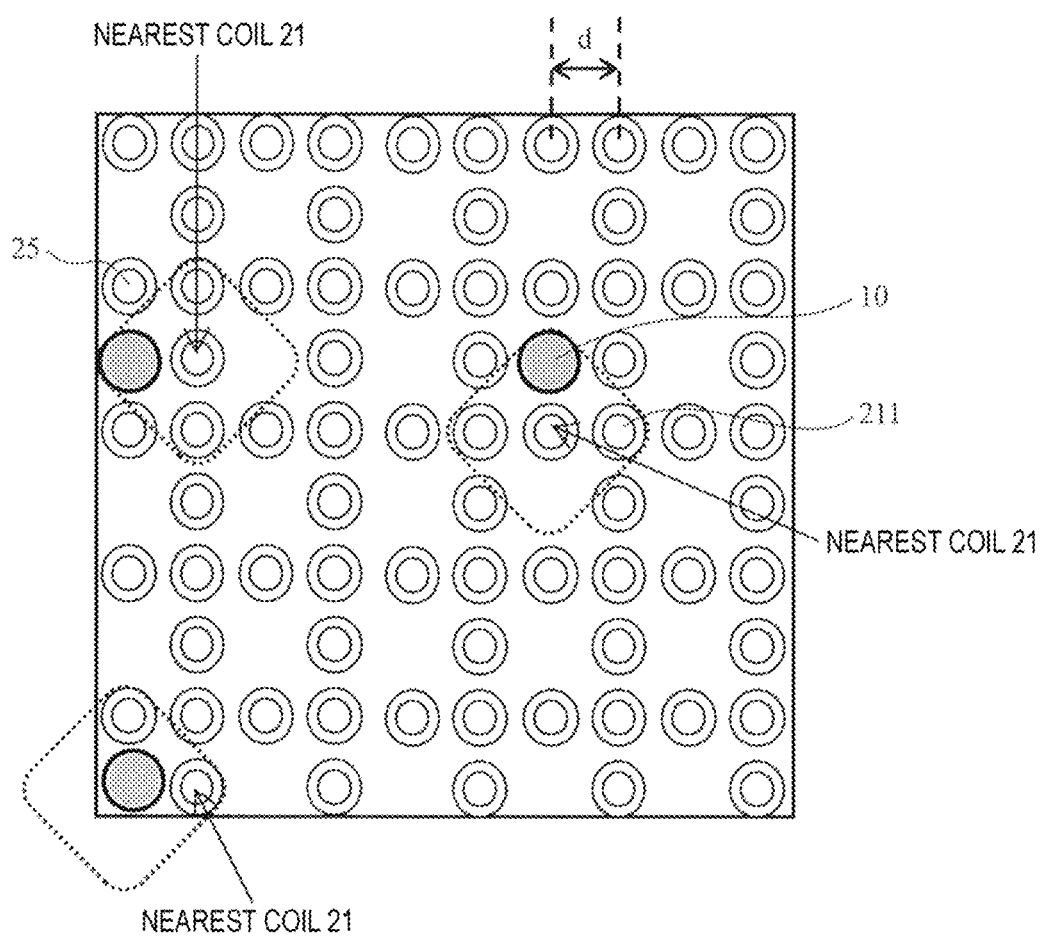

[FIG. 8]
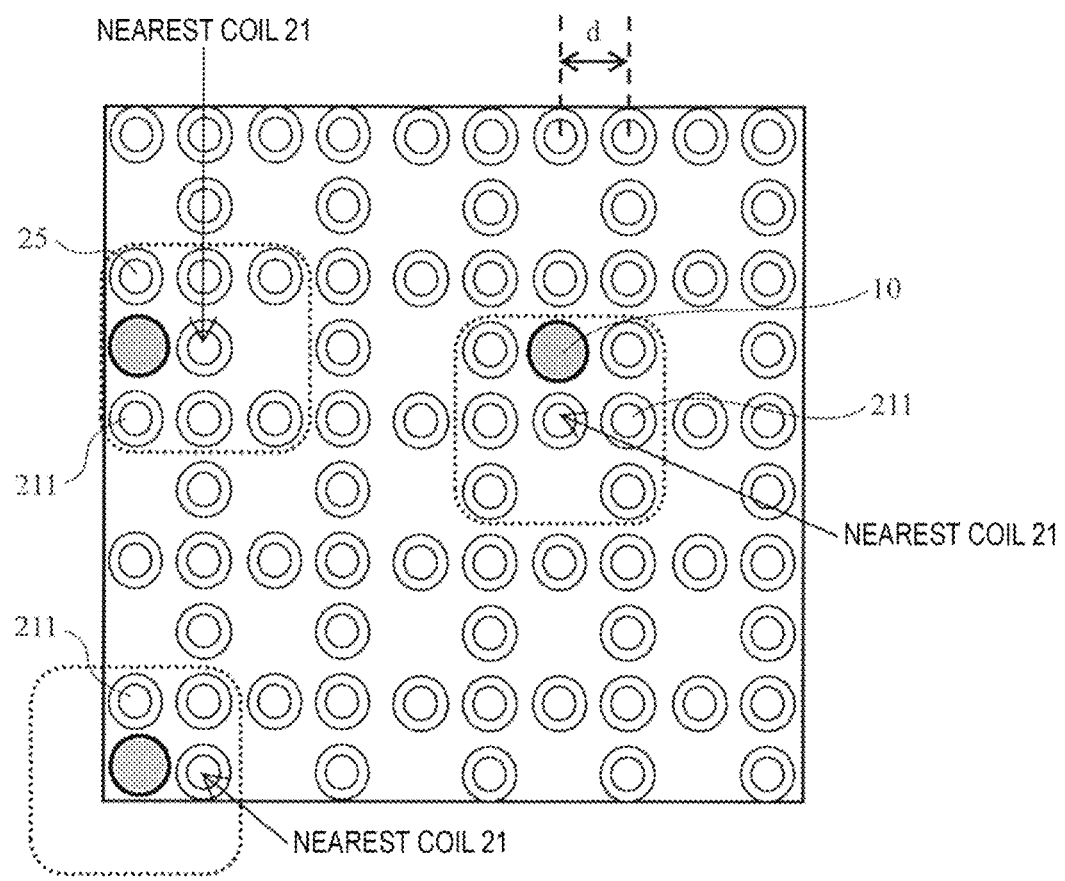

[FIG. 9]
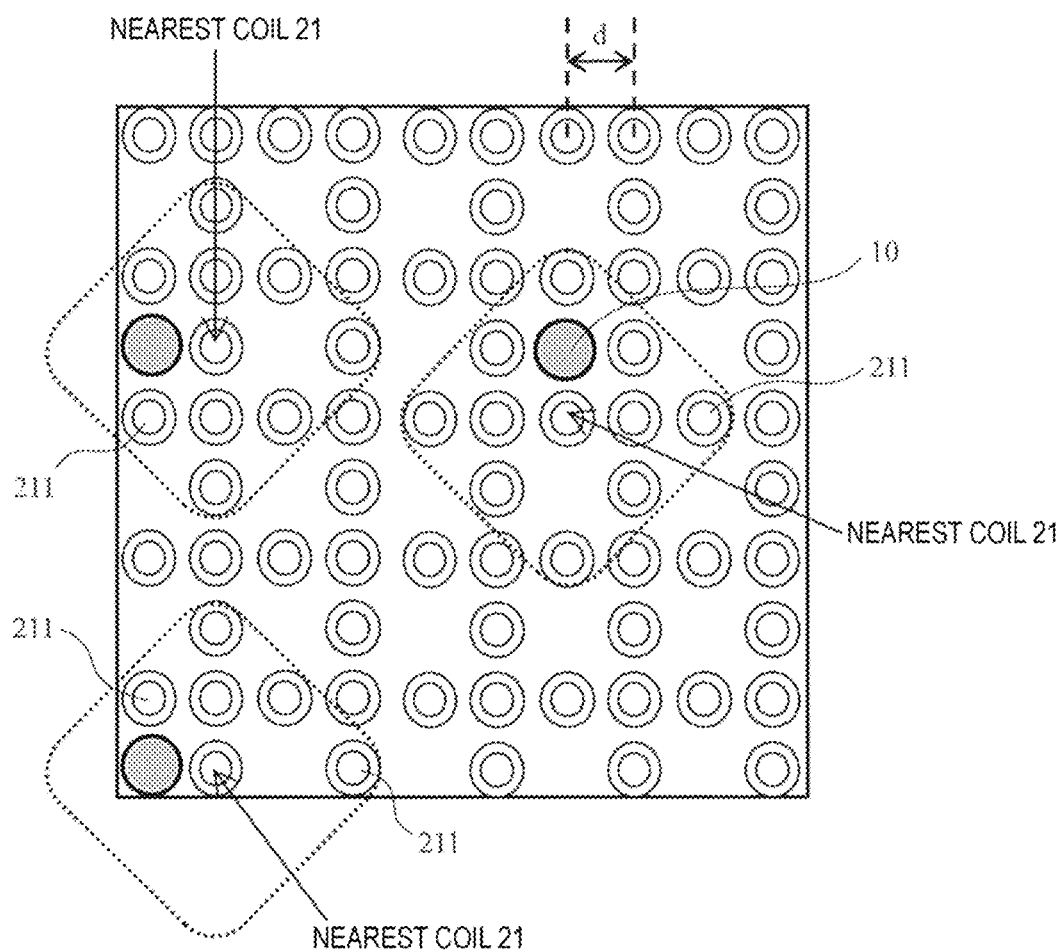

[FIG. 10]
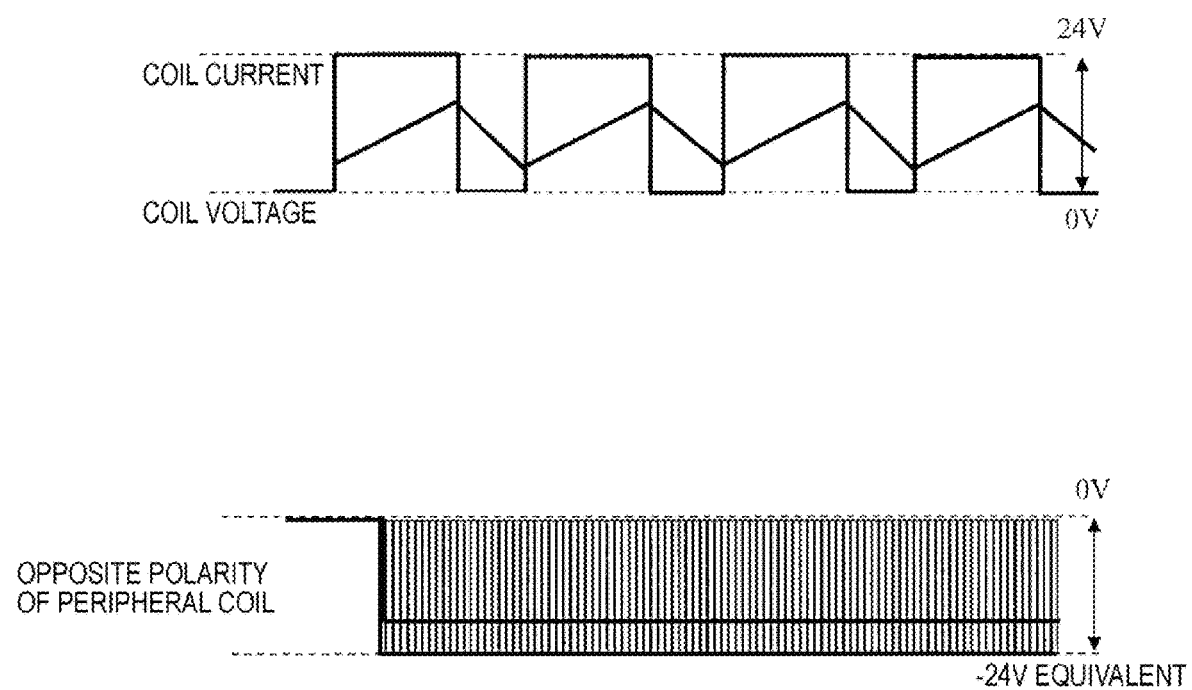

[FIG. 11]
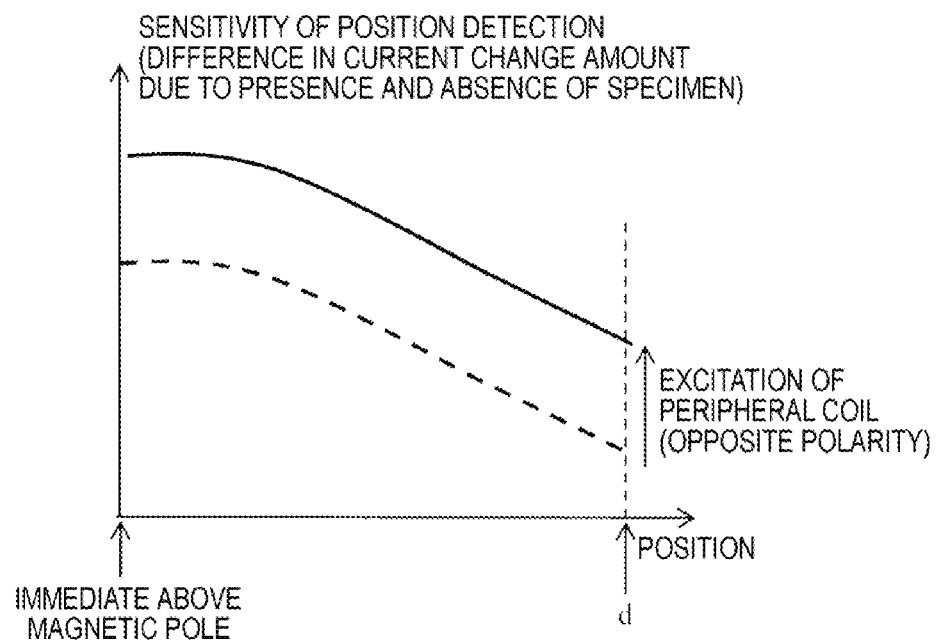

[FIG. 12]
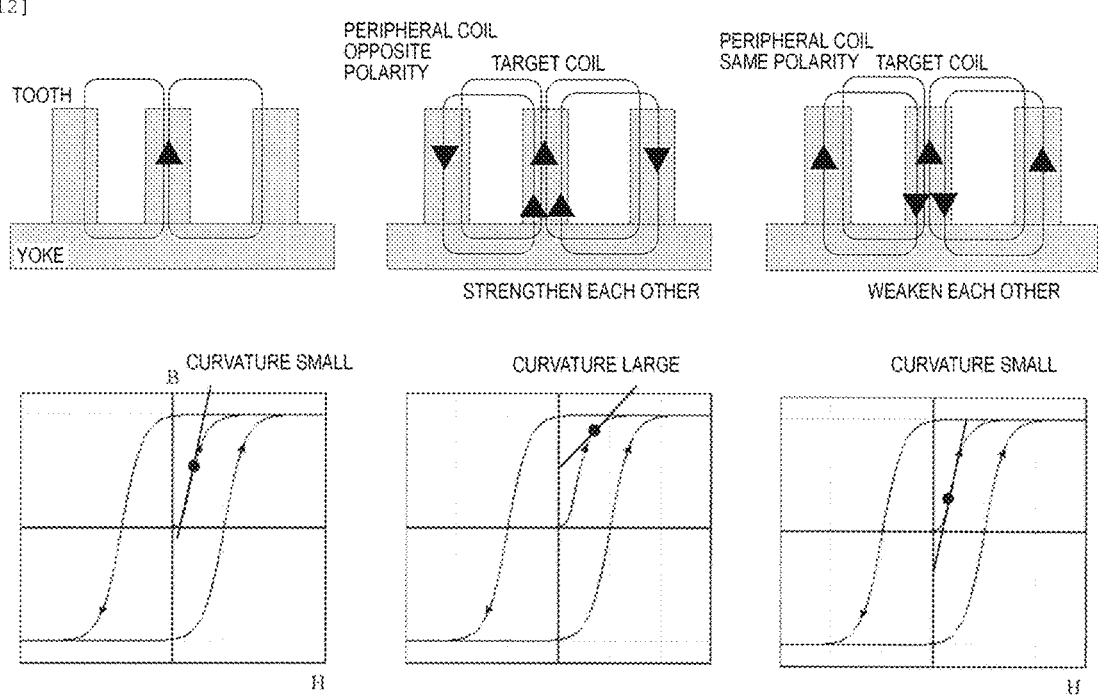

[FIG. 13]
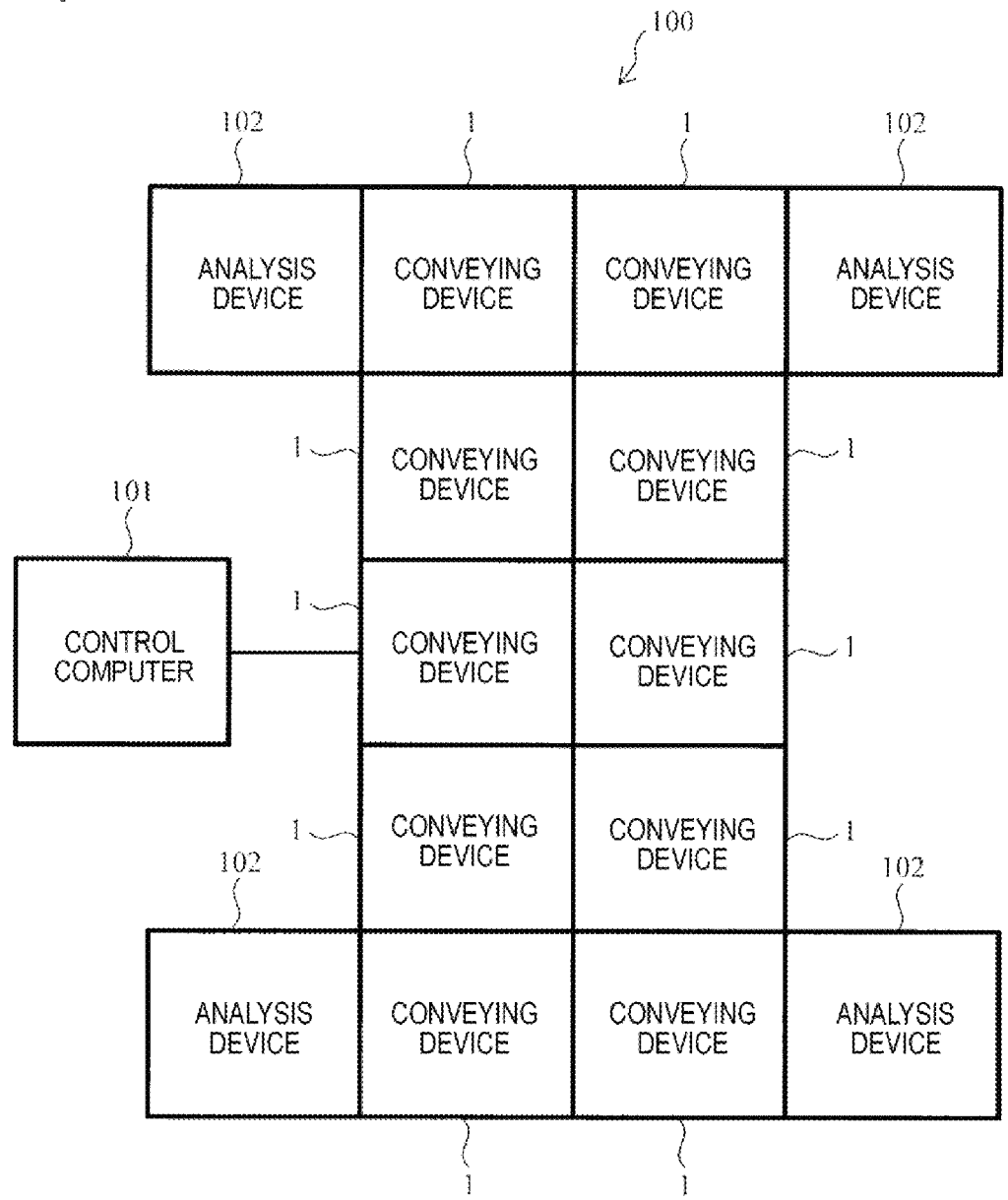

[FIG. 14]
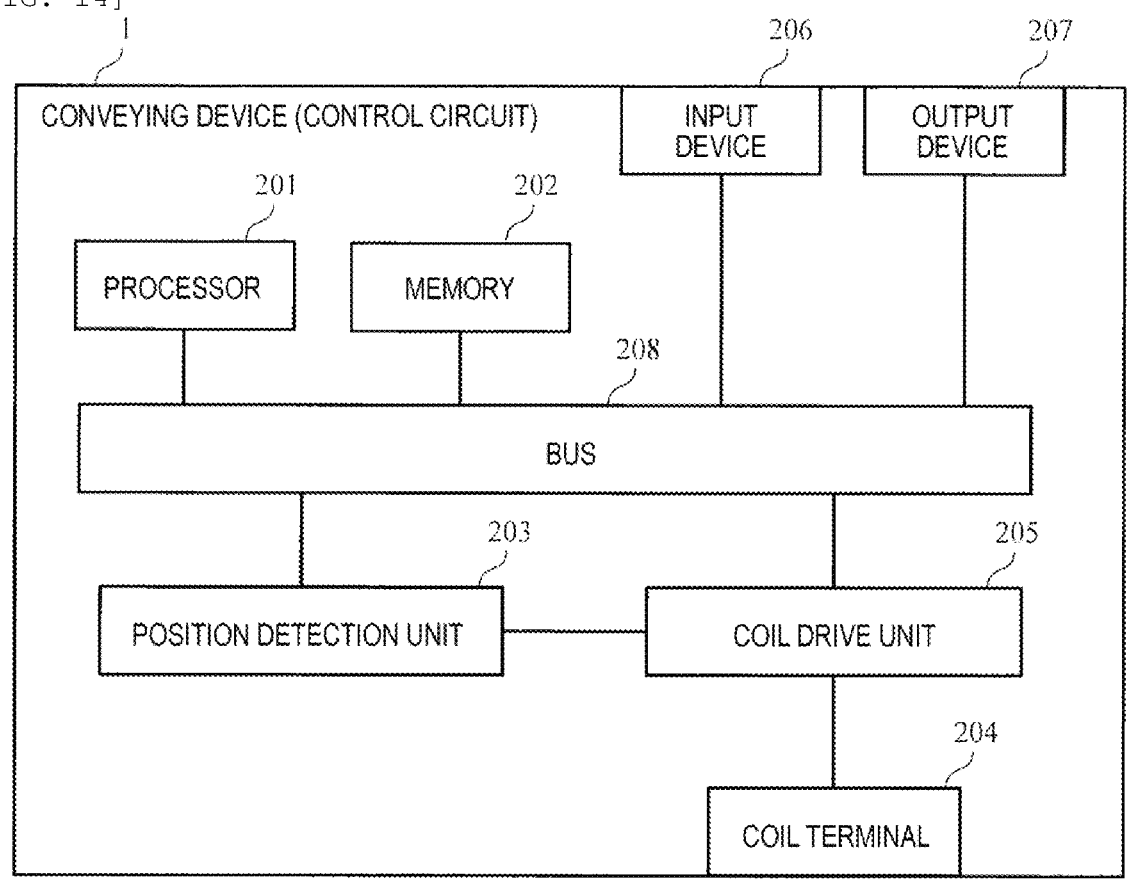

[FIG. 15]
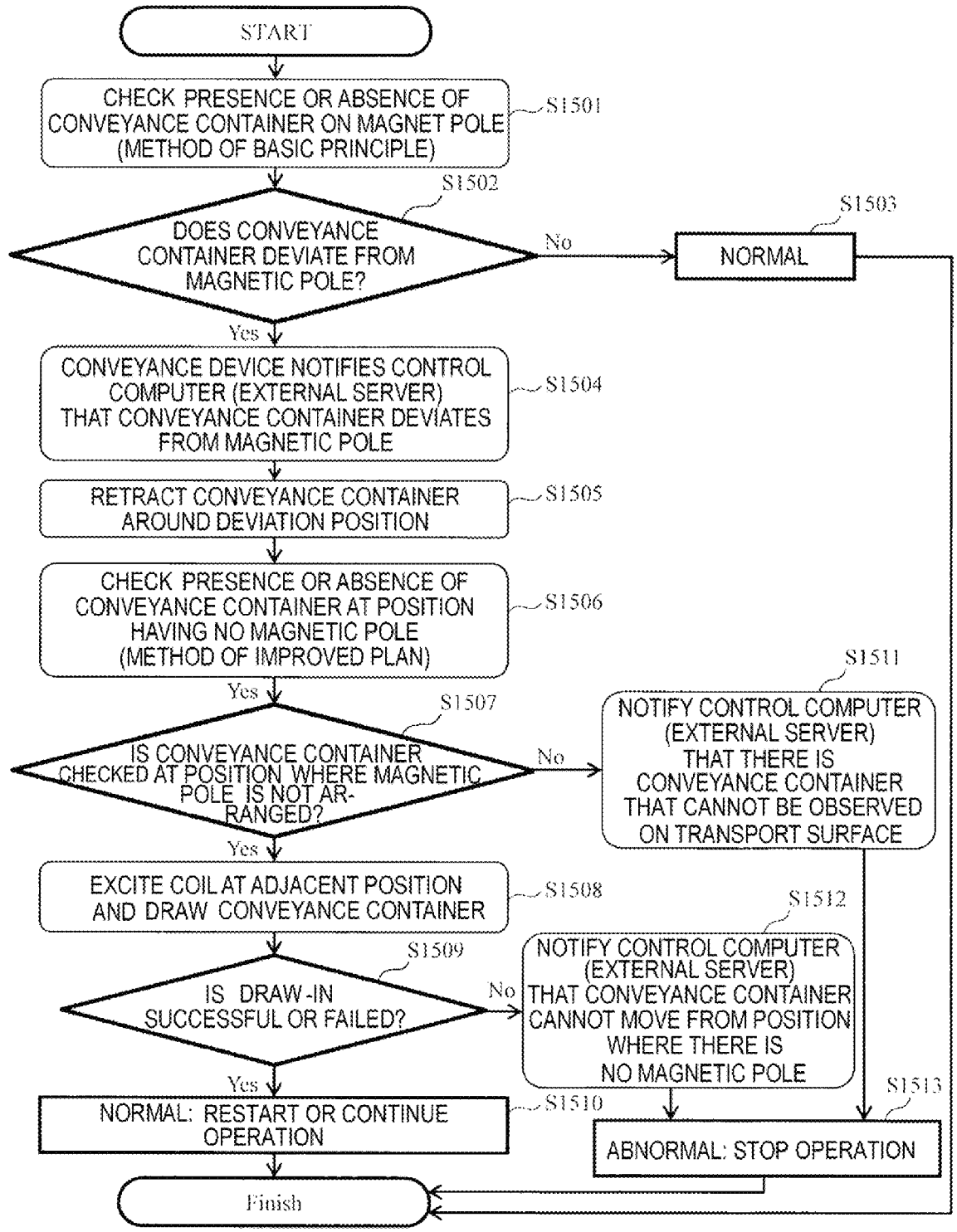

CONVEYING DEVICE AND ANALYSIS SYSTEM

TECHNICAL FIELD

The present disclosure relates to a conveying device and an analysis system.

BACKGROUND ART

In the specimen analysis system for clinical examination, the inspection of the specified analysis item is performed on the specimen (sample) such as blood, plasma, serum, urine, and other body fluids. This specimen analysis system connects devices having a plurality of functions and automatically executes the processing of each process. In other words, in order to streamline the work of the laboratory, an analysis unit (analysis process) that executes a plurality of analyses such as biochemistry and immunity, and a pretreatment unit (pretreatment process) that executes a plurality of pretreatments required for this analysis, and the like are connected by a conveyor line and used as one sample analysis system.

In recent years, the importance of specimen analysis has increased due to the sophistication of medical treatment and the aging of patients. Therefore, in order to improve the analysis processing capacity of the specimen analysis system, high-speed conveyance, mass conveyance, simultaneous conveyance, and conveyance in a plurality of directions of the specimen are required.

For example, Japanese Patent No. 6072052 (PTL 1) discloses a laboratory sample delivery system having high conveyance performance. Specifically, Japanese Patent No. 6072052 (PTL 1) states that a "laboratory sample delivery system (100) includes container carriers adapted to carry sample containers (3), which are several container carriers (1) and each of which includes at least one magnetically active device, preferably at least one permanent magnet, a conveyance plane (4) adapted to carry the container carriers, and electromagnetic actuators, which are a plurality of electromagnetic actuators arranged below the conveyance plane in a stationary manner and adapted to move the container carriers on the conveyance plane by applying a magnetic force to the container carriers" (see abstract).

Further, JP-B-6072052 (PTL 1) states that "the system can further include a container carrier detection device adapted to detect the presence and position of a container carrier located on the conveyance plane. The container carrier detection device provides the optimized tracking of container carriers placed on the conveyance surface" (see paragraph [0034]).

Further, Japanese Patent No. 6072052 (PTL 1) states that "the electromagnetic actuators 5 are arranged in rows and columns, for example, 16 rows and 16 columns, and the rows and columns are either a first grid dimension g1 or a second grid dimension g2, where g2=2×g1. Adjacent rows have different grid dimensions and adjacent columns have different grid dimensions. When a position or field on the conveyance plane must be accessible as a target destination, a corresponding electromagnetic actuator is provided under the target destination thereof. If a particular field or region does not need to be accessible, the electromagnetic actuator at that position may be omitted" (See paragraph [0053]). Here, the electromagnetic actuator means a magnetic pole (a set of a magnetic body core and a coil).

CITATION LIST

Patent Literature

PTL 1: JP-B-6072052

SUMMARY OF INVENTION

Technical Problem

However, according to Japanese Patent No. 6072052 (PTL 1), the specimen analysis system requires a plurality of container carrier detection devices for detecting the position of the magnetically active devices provided on the specimen conveyance carrier. Further, since these container carrier detection devices need to be arranged on the transfer surface side, a dedicated printed circuit board is required. Therefore, there is a problem that the device becomes complicated and the cost increases.

Further, in Japanese Patent No. 6072052 (PTL 1), if it is not necessary to make a specific field or region accessible, the electromagnetic actuator at that position may be omitted. This is desirable from the viewpoint of simplifying the device and reducing costs, but if the container carrier deviates to the place or is stuck for some reason, no consideration is given to the means for detecting the position of the container carrier, and thus, the system cannot operate smoothly when such a problem occurs.

In view of such a circumstance, the present disclosure provides a technique for sensitively detecting the position of each actuator (magnetic pole) without using a container carrier detection device.

Solution to Problem

In order to solve the above problems, the present disclosure provides a conveying device that conveys a conveyance container including a magnet or a magnetic body to a target position along a conveyance path, and the conveying device includes a conveyance surface configured by arranging a plurality of magnetic poles including a core and a coil and having a conveyance path, a drive unit for supplying a current to the coil, and a position detection unit for performing a process of estimating the position of the conveyance container, in which the position detection unit performs a process of exciting a first magnetic pole selected to detect the position of the conveyance container, and applying a voltage to at least one second magnetic pole that is a peripheral magnetic pole within a predetermined range from the first magnetic pole and is different from the first magnetic pole in a direction in which the polarity becomes opposite to the exciting current of the first magnetic pole, and a process of estimating the position of the conveyance container based on a current value of the first magnetic pole.

Further features relating to the present disclosure will be apparent from the description herein and the accompanying drawings. In addition, the embodiments of the present disclosure are achieved and implemented by elements and the combination of various elements, and the following detailed description and the aspect of the appended claims.

It should be understood that the description herein is merely exemplary and does not limit the scope of the claims or applications thereof in any way.

Advantageous Effects of Invention

According to the present disclosure, it is possible to implement a conveying device having high reliability, and high detection sensitivity at a low cost.

BRIEF DESCRIPTION OF DRAWINGS

FIG. 1 is a diagram showing a schematic configuration of a conveying device 1 according to a basic principle.

FIG. 2 is a schematic diagram showing an example of a partial sectional configuration of the conveying device 1 shown in FIG. 1.

FIG. 4 is a schematic diagram showing a specific configuration example for current detection.

FIG. 5 is a top view showing a schematic configuration example of a conveyance plane on which magnetic poles 25 of the conveying device 1 are arranged.

FIG. 7 is an explanatory diagram showing an arrangement (1) of magnetic poles in the conveying device 1 according to an improved plan.

FIG. 8 is an explanatory diagram showing an arrangement (2) of magnetic poles in the conveying device 1 according to the improved plan.

FIG. 9 is an explanatory diagram showing an arrangement (3) of magnetic poles in the conveying device 1 according to the improved plan.

FIG. 10 is a diagram showing an example of a voltage characteristic having a characteristic opposite to an exciting current of a selected coil 21.

FIG. 11 is an explanatory diagram showing a relationship between a distance between a magnetic pole and a conveyance container, and a current change amount of a coil when a pulse voltage is applied.

FIG. 12 is a diagram schematically showing a magnetic path when the magnetic pole 25 is excited in the conveying device 1 according to the improved plan.

FIG. 13 is a diagram showing a schematic configuration example of an analysis system 100 according to the present embodiment.

FIG. 14 is a block diagram showing an example of a control circuit configuration of each conveying device 1 that configures a conveyance path of the analysis system 100.

FIG. 15 is a flowchart illustrating details of position detection processing performed by the analysis system 100.

DESCRIPTION OF EMBODIMENTS

Figure 3A:
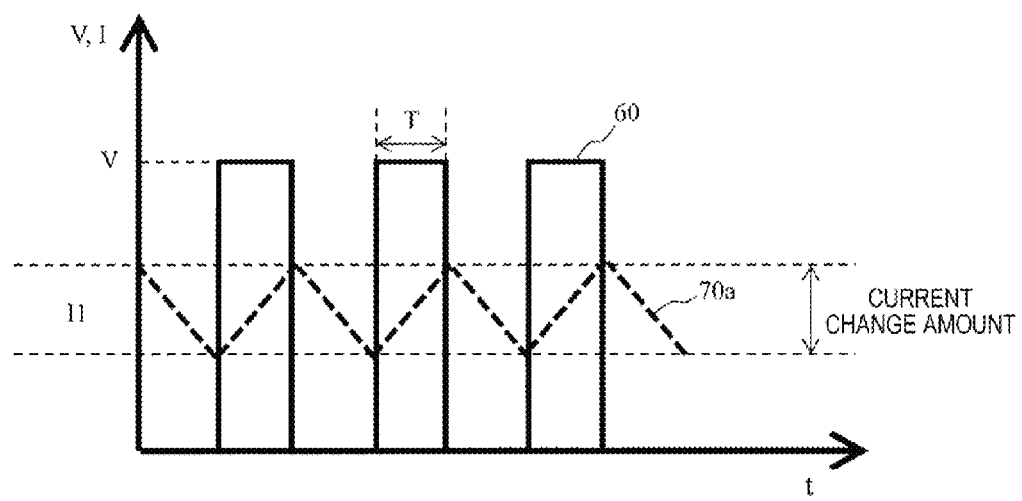
FIGS. 3A-3B is a diagram for illustrating a voltage waveform applied to a coil for detecting the position of a conveyance container 20 by the conveying device 1 and a corresponding current waveform according to the basic principle.

The present embodiment relates to a conveying device used for a specimen analysis system such as a specimen analysis device for analyzing a biological sample (hereinafter referred to as "specimen"), for example, blood, plasma, serum, urine, or other body fluid, and a specimen pretreatment device for executing a pretreatment necessary for this analysis.

Hereinafter, embodiments of the present disclosure will be described with reference to the accompanying drawings. In the accompanying drawings, functionally the same elements may be marked with the same number. It should be noted that the accompanying drawings show specific embodiments and implementation examples in accordance with the principles of the present disclosure, but these are used to understand the present disclosure but not to interpret the present disclosure in a limited manner.

In the present embodiment, the description is given in sufficient detail for those skilled in the art to implement the present disclosure, but it should be understood that other implementations and embodiments are also possible and it is possible to change the configuration and structure and to replace various elements without departing from the scope and spirit of the technical idea of the present disclosure. Therefore, the following description should not be construed as limited thereto.

Further, as described later, the embodiments of the present disclosure may be implemented by software running on a general-purpose computer or may be implemented by dedicated hardware or a combination of software and hardware.

(1) Basic Principle

Outline Configuration of Conveying Device (i) Partial Configuration Example

FIG. 1 is a diagram showing a schematic configuration of a conveying device 1 according to the present embodiment. FIG. 1 schematically shows an outline of a conveying device in which two adjacent magnetic poles 25 and a permanent magnet 10 operate relatively.

The conveying device 1 includes a conveyance plane (see FIG. 5 and the like) that conveys the conveyance container 20 (synonymous with the conveyance container (specimen holder) 20: see FIG. 2) provided with the permanent magnet (magnetic body) 10 thereon, a magnetic pole 25 that is arranged below the conveyance plane and includes a core 22 which is a magnetic body and a coil 21 which is a winding wound around the outer peripheral side of the core 22, a drive unit (drive device for driving the conveyance container) 50 for applying a voltage to the coil 21 of the magnetic pole 25, a current detection unit 30 for detecting the current flowing through the coil 21, and a calculation unit (control device for controlling the drive device) 40 for controlling the drive unit 50 based on the detected current value.

The permanent magnet 10 is arranged in the conveyance container 20. As the permanent magnet 10, for example, a permanent magnet 10 such as neodymium or ferrite is used. Although the description is made using the permanent magnet 10 in the first embodiment, other magnets or soft magnetic bodies may be used instead of the permanent magnet 10. Further, instead of the permanent magnet 10, the permanent magnet 10 and the soft magnetic body may be used in combination.

Here, the "magnetic body" means a permanent magnet 10, another magnet or a soft magnetic body, or a combination of a permanent magnet 10 and a soft magnetic body. Here, the basic principle will be described using a permanent magnet 10 as an example (representative example) of a magnetic body.

(ii) Example of Partial Sectional Configuration

FIG. 2 is a schematic view showing a partial sectional configuration example of the conveying device 1 shown in FIG. 1. The conveyance container 20 such as a specimen holder is configured such that the holding portion of the specimen (container) and the permanent magnet 10 are integrated. The conveyance container 20 is arranged so as to face the magnetic pole 25 via the conveyance plane.

In the conveying device 1, an electromagnetic force is generated in the core 22 by flowing a current through the coil 21 of the magnetic pole 25, and the permanent magnet 10 arranged in the conveyance container 20 is controlled to slide above the space between the plurality of magnetic poles 25 (between a magnetic pole 25 and a magnetic pole 25) and on the conveyance plane so as to relatively move, whereby the conveyance container 20 is conveyed to a desired position.

In the conveying device 1, relative position information between the permanent magnet 10 and the magnetic pole 25 is required. This is to efficiently apply the electromagnetic force generated in the core 22 to the permanent magnet 10 by flowing a current through the coil 21 of the magnetic pole 25, and to move the permanent magnet 10 in a target direction. For example, it is assumed that the permanent magnet 10 is located above (immediately above) one of the two magnetic poles 25. Even if a voltage is applied to the magnetic pole 25a (coil 21a) directly below the permanent magnet 10, no force (thrust) is generated in the permanent magnet 10 in the conveyance direction. On the other hand, when a voltage is applied to the magnetic pole 25b (coil 21b) where the permanent magnet 10 is not located thereabove (directly above) (not directly below the permanent magnet 10), a force is generated to attract the permanent magnet 10 to the magnetic pole 25b, and the force (thrust) is generated in the conveyance direction. That is, by applying a voltage to a desired magnetic pole 25 (coil 21), it is possible to efficiently generate a force in the conveyance direction in the permanent magnet 10. Then, by selecting the magnetic pole 25 (coil 21) to which the voltage is applied, the orientation (direction) of the force in the conveyance direction can be controlled.

Principle of Position Detection of Conveyance Container

The position detection of the conveyance container 20 on the conveyance path will be described. When the permanent magnet 10 is on the magnetic pole 25 on the front side of FIG. 1, the magnetic field generated by the permanent magnet 10 acts on the magnetic pole 25. Here, the magnitude of the magnetic field is difference between the magnetic field acting on the magnetic pole 25 on the side closer to the permanent magnet 10 and that acting on the magnetic pole 25 on the far side. That is, the magnitude of the magnetic field acting on the magnetic pole 25 changes depending on the relative position between the permanent magnet 10 and the magnetic pole 25.

The core 22 is composed of a magnetic body and has the property that the magnetic flux passing through the core 22 becomes difficult to pass as the magnetic flux increases. Here, when a voltage is applied to the coil (winding) 21 to make a current flow, a magnetic flux (magnetic field) generated by the current is generated in the core 22. Therefore, a magnetic flux (magnetic field) generated by the permanent magnet 10 and a magnetic flux (magnetic field) generated by the current flowing through the coil (winding) 21 are generated in the core 22. Generally, when a current flows through a coil (winding) 21, a magnetic field is generated around the coil (winding) 21, and the generated magnetic flux is proportional to the current value passed through. This proportionality constant is called inductance. However, in a circuit having a magnetic body such as the core 22, the inductance changes due to the saturation characteristic of the core 22.

When saturation of the core 22 occurs, the inductance changes depending on the magnitude of the magnetic flux generated in the core 22. That is, the inductance of the coil (winding) 21 changes depending on the magnitude of the magnetic flux of the permanent magnet 10. This means that the inductance of the coil (winding) 21 changes depending on the position of the permanent magnet 10. That is, when there is a magnetic field from the permanent magnet 10, magnetic saturation occurs in the coil (winding) 21 and the magnetic permeability decreases, and thus, the current flowing through the coil (winding) 21 changes.

Therefore, when a voltage is applied to the coil (winding) 21, the inductance L can be calculated by detecting the current flowing through the coil (winding) 21 and how the current flows. That is, if the inductance L of the coil (winding) 21 that changes depending on the position of the permanent magnet 10 is detected, the position of the permanent magnet 10 that affects the inductance can be obtained. Therefore, the drive unit 50 is connected to the coil (winding) 21 of the magnetic poles 25, and a current detecting unit 30 (for example, a resistor is arranged) for detecting the current value flowing through the coil (winding) 21 is provided. Then, a voltage is applied to the coil (winding) 21 by the drive unit 50, the current value generated by the voltage is detected by the current detection unit 30, and the value is read by the calculation unit 40.

Voltage Waveform Applied to Coil and Current Waveform Detected

Figure 3B:
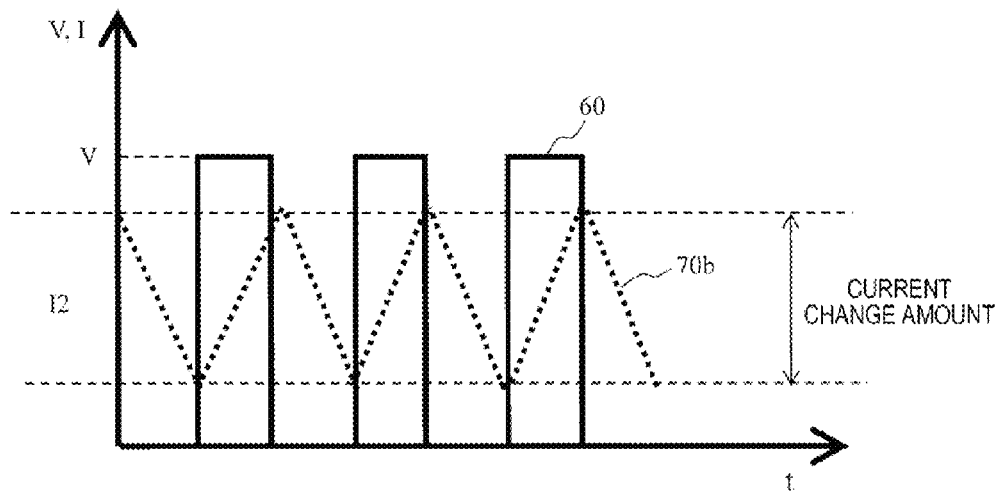

The voltage waveform applied to the coil for detecting the position of the conveyance container in the conveying device 1 and the corresponding current waveform will be described. FIGS. 3A-3B is a diagram for illustrating a voltage waveform applied to the coil by the conveying device 1 to detect the position of the conveyance container 20 and a current waveform corresponding to the voltage waveform according to the basic principle.

The magnitude (V) and pulse width (T) of the voltage pulse 60 are determined by how much voltage is applied to the magnetic pole 25. Then, when the permanent magnet 10 of the conveyance container 20 approaches the magnetic pole 25, the current waveform 70a changes to the current waveform 70b due to the magnetic saturation of the magnetic pole 25.

The conveying device 1 includes the current detection unit 30 that detects a current and can detect the position of the conveyance container 20 based on the current value that is detected by the current detection unit 30 and measured by the calculation unit 40. That is, the position of the conveyance container 20 is detected by detecting the amount of change in the current detected by the current detection unit 30 (the amount of change in the rising/falling current of the position detection pulse). As shown in FIG. 3A, when the magnetic pole 25 is not affected by the permanent magnet 10 of the conveyance container 20, a current change amount is I1. On the other hand, as shown in FIG. 3B, when the magnetic pole 25 is affected by the permanent magnet 10 of the conveyance container 20 (for example, when the permanent magnet 10 is immediately above or near the magnetic pole 25), the current change amount is I2, which is larger than I1.

The current detection unit 30 may be a series resistor, for example, one using a current transformer, one using a Hall current sensor, or the like, but is not limited thereto.

Configuration Example for Current Detection

FIG. 4 is a schematic diagram showing a specific configuration example for current detection. As shown in FIG. 4, in the conveying device 1A in which the two magnetic poles 25 and the permanent magnet 10 operate relatively, the magnetic pole 25 is composed of a columnar core 22 and a coil (winding) 21 wound around the outer peripheral side of the core. Further, the permanent magnet 10 is arranged so as to face the columnar core 22. The drive unit 50 is connected to the coil (winding) 21. Further, a resistor 31 for detecting the current flowing through the coil (winding) 21 is provided between the coil (winding) 21 and the drive unit 50.

In the conveying device 1, magnetic poles are arranged in a plurality of rows and a plurality of columns to form a conveyance path.

Configuration Example of Conveyance Plane

FIG. 5 is a top view showing a schematic configuration example of a conveyance plane on which the magnetic poles 25 of the conveying device 1 are arranged. In FIG. 5, the magnetic poles 25 having 5 rows and 5 columns are aligned in a grid pattern to form a conveyance path. The conveyance path is set to travel on the magnetic poles 25 arranged in a grid pattern.

The conveying device 1 can convey the conveyance container 20 provided with the permanent magnet 10 in any target direction (conveyance direction) by exciting the magnetic pole 25 (applying a voltage to the magnetic pole 25 (coil 21)) based on the target conveyance path.

When one magnetic pole is excited, the conveyance containers on the magnetic poles adjacent to the top, bottom, left, and right of the magnetic pole are attracted, and thus, the conveyance path is desirable to have a grid pattern of one row and one column (if the magnetic poles 25 are spread closely, the placed plurality of conveyance containers 20 are likely to collide with each other). Therefore, the magnetic pole 25 can be omitted in the region outside the conveyance path, and the component cost can be reduced or the weight can be reduced.

Assuming that the distance between the magnetic poles 25 (distance between the centers of the magnetic poles 25) is d, the maximum distance between the conveyance container 20 and the magnetic pole 25 on the conveyance plane is d (maximum distance when the conveyance container is out of the conveyance path). On the other hand, on the conveyance path, the maximum distance between the conveyance container 20 and the magnetic pole 25 is d/2.

When some abnormality occurs, the container carrier deviates to a place outside the conveyance path where the magnetic pole 25 is not arranged, and is stuck into that place for some reason, the method for detecting the presence or absence of the conveyance container is not disclosed in Japanese Patent No. 6072052 (PTL 1). In Japanese Patent No. 6072052 (PTL 1), for example, it may be considered that a dedicated device for detecting the position of the conveyance container 20 is arranged at a position on the conveyance plane where the magnetic pole 25 is not arranged, but a control circuit for the dedicated device is required, which leads to an increase in cost.

According to the present embodiment (basic principle and improved plan described later), the conveying device 1 first selects one from the nearest magnetic poles 25 in order to detect the presence or absence of the conveyance container 20 at a position on the conveyance plane where the magnetic pole 25 is not arranged. As the nearest magnetic pole 25, for example, based on the conveyance history information of the conveyance container 20 on the conveyance path (path passed up to the present time, movement speed (may be an average value), moving time up to the present time), it is possible to select from a plurality of magnetic poles 25 around the conveyance position scheduled at the present time. FIG. 5 shows a candidate example of the nearest magnetic pole 25. When detecting the presence or absence of the specimen holder at the position of the edge portion or the corner portion on the plane grid point of the conveying device 1, the number of the nearest magnetic poles is 3 or 2 as an exception.

Then, it is possible to confirm that the conveyance container 20 is not on the magnetic poles 25 on both sides of the selected nearest magnetic pole 25 based on the above-mentioned position detection method (method for checking the current change amount: based on the table showing the relationship between the current change amount and the position (for example, see FIGS. 6A-6B), the relative position corresponding to the detected current change amount can be obtained). When the conveyance container 20 is located on the magnetic poles 25 on both sides thereof, the conveyance container 20 can be moved to another place on the conveyance path by the above-mentioned driving method.

Further, a predetermined pulse voltage is applied to the selected magnetic pole 25, and the presence or absence of the conveyance container 20 at a position separated from the selected magnetic pole 25 by a distance of x can be detected from the current change amount, as in the above-mentioned position detection method of the conveyance container 20.

Figure 6A:
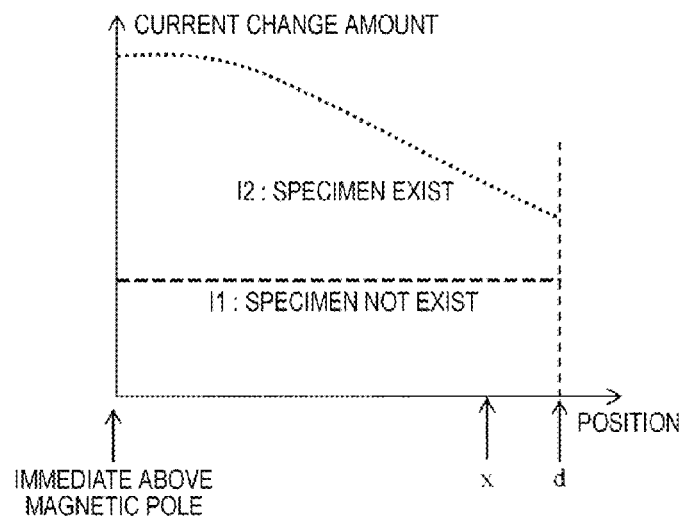
FIGS. 6A-6B is a graph in which a horizontal axis represents a distance from a selected magnetic pole 25 (nearest magnetic pole 25), and a vertical axis represents a current change amount.
Figure 6B:
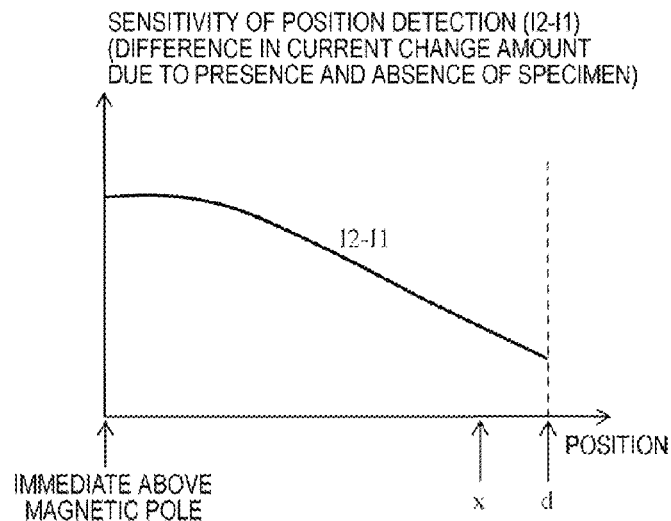

Relationship Between Distance from Selected Magnetic Pole and Current Change Amount FIGS. 6A-6B is a graph in which the distance from the selected magnetic pole 25 (nearest magnetic pole 25) is on the horizontal axis and the current change amount is on the vertical axis. This makes it possible to know the distance from the selected magnetic pole 25 corresponding to the current change amount.

At this time, unlike the above-mentioned detection of the presence or absence of the conveyance container 20 on the conveyance path, the conveyance container 20 is detected at a position separated from the magnetic pole 25 by a distance of d/2 or more, and thus, the presence or absence of the conveyance container 20 at a place deviating from the conveyance path may be determined by the threshold value different from that during conveyance or the threshold value based on the current change amount at a position separated from the magnetic pole by a distance of d/2 or more. When it is determined that the conveyance container 20 exists at a position of a distance of d/2 or more, it is confirmed that the conveyance container 20 is not on the magnetic poles 25 on both sides of the selected magnetic pole 25, and thus, it can be known that the conveyance container (specimen holder) 20 exists at both or at least one side of the position where the magnetic poles 25 on both sides of the selected magnetic pole 25 are not arranged.

As described above, the specimen conveying device 1 performs position detection (position estimation) of the conveyance container 20 using the coil current (or the current flowing through the shunt resistor), and the presence or absence of the conveyance container (specimen holder) 20 can be detected without using a dedicated position detection device even if the conveyance container 20 deviates to a position outside the conveyance path on the conveyance surface where the magnetic poles 25 are not arranged, or is stuck for some reason.

(2) Improved Plan of Basic Principle

The conveying device 1 according to the improved plan will be described with reference to FIGS. 7 to 12. The improved plan is improved in the position detection method of the magnetic pole 25 described in the basic principle and the detection sensitivity can be improved by utilizing all or at least one of the peripheral coils 211 in order to detect the presence or absence of the conveyance container (specimen holder) 20 at a position separated from the coil 21 by a distance of d/2 or more. That is, in the method based on the basic principle, whether or not the target conveyance container 20 is on the magnetic pole 25 can be determined with high sensitivity, but when the target conveyance container 20 is out of the magnetic pole 25 (conveyance path), it is not possible to detect with high sensitivity whether or not the target conveyance container 20 is on the conveyance surface where the magnetic pole 25 is not arranged. Therefore, the present disclosure proposes an improved plan in which the basic principle is improved so that the position of the conveyance container 20 can be detected more sensitively.

Concept of Peripheral Coil

The peripheral coil 211 means a plurality of coils 211 (coils other than the nearest coil) whose distance from the selected coil 21 (nearest coil 21: the nearest coil can be selected according to the method described in the basic principle) is d, d√2, or 2d, and the number thereof is 2 (in the case of the conveyance plane configuration example shown in FIG. 7), 6 (in the case of the conveyance plane configuration example shown in FIG. 8), and 10 (in the case of the conveyance plane configuration example shown in FIG. 9) and the like, respectively.

Voltage Application to Peripheral Coils

In the improved plan, in order to increase the detection sensitivity of the conveyance container (specimen holder) 20, a voltage (any voltage value) is applied to the peripheral coil 211 in a direction in which the polarity becomes opposite to the exciting current of the selected coil (nearest coil) 21. This voltage may be direct current or pulse voltage. The coil current does not have to be direct current but the average value can be substantially constant. FIG. 10 is a diagram showing an example of a voltage characteristic having a characteristic opposite to the exciting current of the selected coil 21. When a voltage having a characteristic opposite to the exciting current is used as a pulse voltage, any duty ratio can be adapted according to the current value to be passed.

It is desirable that there is no conveyance container (specimen holder) 20 on or adjacent to the peripheral coil 211. Whether or not the conveyance container (specimen holder) 20 is on or near the peripheral coil 211 can be checked by using the position detection method based on the above-mentioned basic principle. When it is determined that the conveyance container (specimen holder) 20 is on the peripheral coil 211, the conveying device 1 can move the conveyance container (specimen holder) 20 to another place by a normal driving method.

Improvement of Detection Sensitivity

According to the improved plan, the coil 211 around the selected coil (nearest coil) 21 is excited with the polarity opposite to the exciting current to the selected coil 21, and a predetermined pulse voltage is applied to the selected coil 21 as in the above-mentioned basic principle. Then, the presence or absence of the conveyance container (specimen holder) 20 at a position separated from the coil 21 by a distance of d is detected based on the current change amount, as in the normal position detection method of the conveyance container (specimen holder) 20.

At this time, as a result of exciting the peripheral coils with the opposite polarity, the iron core of the selected coil is in a state where magnetic saturation is likely to occur, and the difference in the current change amount becomes large between when the specimen holder is not only directly above the selected coil but also at a position separated by a distance of d, and when it is not, and the sensitivity to detect the presence or absence of the specimen holder is improved. FIG. 11 is an explanatory diagram showing a relationship between the distance between the magnetic pole and the conveyance container and the current change amount of the coil when a pulse voltage is applied. As can be seen from FIG. 11, when a predetermined pulse voltage is applied to the selected coil 21 in a state of being excited with the polarity opposite to the exciting current, the position detection sensitivity of the conveyance container 20 is improved.

Next, the principle of improving the detection sensitivity by magnetic saturation will be described. FIG. 12 is a diagram schematically showing a magnetic path when the magnetic pole 25 is excited in the conveying device 1 according to the improved plan. The magnetic pole 25 is composed of a coil 21 and a core (iron core) 22. The current change amount used to detect the position of the conveyance container (specimen holder) 20 is inversely proportional to the inductance of the coil 21. Further, the inductance of the coil 21 is roughly proportional to the relative magnetic permeability of the core (iron core) 22. Since the magnetic field generated from the magnet 10 (or magnetic body) passes through the core (iron core) 22, the magnetic field in the core (iron core) 22 changes (FIG. 12B) depending on whether or not there is a magnet 10 (or magnetic body) in the conveyance container (specimen holder) 20 near the coil 21. At this time, since the relative magnetic permeability of the core (iron core) 22 also changes accordingly, the inductance of the coil 21 changes, and the current change amount also changes. According to such a principle, the current change amount changes depending on the presence or absence of the conveyance container (specimen holder) 20 near the coil 21.

Then, when the coils 211 around the selected coil 21 are excited with the opposite polarity, the magnetic flux of the same polarity increases in the selected coil 21. As a result, the core (iron core) 22 changes to a state in which magnetic saturation is likely to occur, and the change in the current change amount depending on the presence or absence of the conveyance container (specimen holder) 20 becomes large (FIG. 12C).

As described above, in the specimen conveying device that detects the position of the conveyance container using the coil current (or the current flowing through the shunt resistor), even if the conveyance container 20 deviates to a position outside the conveyance path on the conveyance surface where the magnetic poles are not arranged, or is stuck for some reason, it is possible to detect the presence or absence of the conveyance container (specimen holder) 20 without using a dedicated container carrier detection device (position detection device) as in the basic principle. Although the number of coils to be excited increases as compared with the case of the basic principle, the detection sensitivity can be improved.

(3) Analysis System (Conveyance System)

The analysis system according to the present embodiment (analysis system 100 described later) performs a process of detecting the conveyance container 20 at each place on the conveyance surface of each conveying device 1 described in the above-mentioned basic principle or improved plan, when it is presumed that the conveyance container 20 has deviated to a position outside the conveyance path on the conveyance surface where the magnetic poles are not arranged, or is stuck for some reason.

System Configuration Example

FIG. 13 is a diagram showing a schematic configuration example of the analysis system 100 according to the present embodiment. The analysis system 100 includes a control computer 101, a plurality of analysis devices 102, and a plurality of conveying devices 1 for conveying conveyance containers (specimen holders) 20 between the analysis devices 102. The number of analysis devices 102 and the number of conveying devices 1 vary depending on the type of specimen to be analyzed and the details of analysis. The control computer 101 controls the entire system, such as designating a conveyance path for conveying the conveyance container (specimen holder) 10 and the order of analysis. Further, the control computer 101 performs a designated operation in response to an instruction input from the operator.

FIG. 14 is a block diagram showing a control circuit configuration example of each conveying device 1 that configures a conveyance path of the analysis system 100. The control circuit of the conveying device 1 includes a processor 201 composed of a CPU, an MPU, or the like, a memory 202 for storing various data and operating parameters, a position detection unit 203 for calculating the position detection of the conveyance container 20, a coil drive unit 205 that drives the coil 21 by applying a voltage to a coil terminal 204, an input device 206 composed of input and output ports for serial communication and parallel communication, a keyboard, a mouse, a touch panel, and the like, and an output device 207 composed of a display, a printer, and the like, which are connected to each other by a bus 208. To show the correspondence with the conveying device 1 shown in FIG. 1, the function of the position detection unit 203 is included in the calculation unit 40, and the coil drive unit 205 corresponds to the drive unit 50 described above. It should be noted that some functions of the position detection unit 203 may be implemented by a software program and the processor 201 may execute the functions.

Details of Position Detection Processing (Position Check Processing)

FIG. 15 is a flowchart for illustrating the details of the position detection processing performed by the analysis system 100. In the following, it will be described that the position detection unit 203 and the processor 201 execute each process as the operation main body. However, since the function of the position detection unit 203 is implemented by the software program, only the processor 201 will be necessary to be described as the operation main body.

(i) Step 1501

The position detection unit 203 checks the presence or absence of the conveyance container 20 on the conveyance path on which the magnetic pole 25 is laid by the method described in the above-mentioned basic principle. That is, the position detection unit 203 detects the current change amount when a voltage is applied to the coil 21 of each magnetic pole 25 configuring the path, applies the current change amount to the table (FIGS. 6A-6B), and determines whether or not the conveyance container 20 exists on the path.

(ii) Step 1502

Based on the result of step 1501, the position detection unit 203 determines whether the conveyance container 20 deviates from the magnetic pole 25 of the conveyance path. For example, when the target conveyance container 20 is not detected near the coil position specified by the control command or near the expected position on the conveyance path calculated based on the elapsed time (the approximate position is calculated based on the conveyance speed and the elapsed time), it can be determined that the conveyance container 20 has deviated from the conveyance path. If it is determined that the deviation has been made (Yes in step 1502), the process proceeds to step 1502. If it is determined that the deviation has not occurred (No in step 1502), the process proceeds to step 1503.

(iii) Step 1503

The position detection unit 203 determines that the conveyance operation of the conveyance container 20 is normally performed, and ends the position detection processing.

(iv) Step 1504

The position detection unit 203 notifies the processor 201 that the conveyance container 20 has deviated from the magnetic pole 25 of the conveyance path. Then, the processor 201 that has received the notification notifies the control computer (external server) 101.

(v) Step 1505

The position detection unit 203 determines whether another conveyance container 20 exists around the target conveyance container 20 determined to have deviated, and if another conveyance container 20 exists, retracts another conveyance container 20. The presence or absence of another conveyance container 20 can be determined by the same method as the above basic principle. Further, when other conveyance containers 20 are densely packed around the target conveyance container 20, the processor 201 receives the position information of the conveyance container 20 on the adjacent conveyance path from the processor 201 of the adjacent conveying device 1. The coil drive unit 205 is controlled so as to move the other conveyance container 20 to the adjacent conveying device 1 and secures a space in which the target conveyance container 20 can move on the conveyance path.

(vi) Step 1506

The position detection unit 203 checks the presence or absence of the conveyance container 20 at the position where the magnetic pole 25 is not arranged by the method described in the above-mentioned improved plan (according to the improved plan, the presence or absence of the conveyance container 20 can be detected even if the conveyance container 20 deviates to a place where the magnetic pole 25 (coil 21) is not arranged).

(vii) Step 1507

Based on the result of step 1506, the position detection unit 203 checks whether the target conveyance container 20 is at a position where the magnetic pole 25 is not arranged. When it is determined that the target conveyance container 20 is at a position where the magnetic pole 25 is not arranged (Yes in step 1507), the process proceeds to step 1508. When it is determined that the target conveyance container 20 is at a position where the magnetic pole 25 is arranged (No in step 1507), the process proceeds to step 1511.

(viii) Step 1508

Since the position detection unit 203 is to prevent the two conveyance containers 20 from being drawn into the same place at the same time before exciting the adjacent coil to draw in the conveyance container, it is necessary to first check that there is no other conveyance container 20 on the magnetic pole 25 adjacent to the selected magnetic pole 25 (the nearest coil 21 of the target conveyance container 20).

The processor 201 receives a notification (that the target conveyance container 20 is at a position where the magnetic pole 25 is not arranged, and the other conveyance container 20 is not on the adjacent magnetic pole 25) from the position detection unit 203, the coil 21 of the magnetic pole 25 adjacent to the target conveyance container 20 is excited, and the coil drive unit 205 is controlled so as to draw the target conveyance container 20 onto the conveyance path.

(ix) Step 1509

The processor 201 determines whether or not the draw-in is successful. If the draw-in is successful (Yes in step 1508), the process proceeds to step 1510. If the draw-in fails (No in step 1509), the process proceeds to step 1512.

(x) Step 1510

The processor 201 notifies the control computer (external server) 101 of the analysis system 100 that the conveyance container 20 has been successfully drawn into the conveyance path. Then, upon receiving this notification, the control computer 101 restarts or continues the operation of the analysis system 100.

(xi) Step 1511

The position detection unit 203 notifies the processor 201 that the target conveyance container 20 cannot be observed on the conveyance surface (the place where the magnetic pole 25 is arranged and the place where the magnetic pole 25 is not arranged). Upon receiving the notification, the processor 201 notifies the control computer (external server) 101 that the target conveyance container 20 cannot be observed. It should be noted that "cannot be observed on the conveyance surface" can be defined as, for example, meaning that the target conveyance container 20 cannot be observed in a predetermined region or at and around the place where the target conveyance container 20 is originally supposed to exist.

(xii) Step 1512

If the target conveyance container 20 is located on the conveyance surface at a position outside the conveyance path where there is no magnetic pole 25, and the conveyance container (specimen holder) 20 cannot be drawn in by exciting the adjacent coil, there is a possibility that the conveyance container (specimen holder) 20 is stuck into the place for some reason. In such a case, the position detection unit 203 notifies the processor 201 that the target conveyance container 20 has deviated from the conveyance path and cannot be moved. Upon receiving this notification, the processor 201 notifies the control computer (external server) 101 that the target conveyance container 20 cannot be moved on the conveyance path. This allows the system operator to accurately check the place where the abnormality has occurred.

(xiii) Step 1513

The control computer 101 determines that an abnormality has occurred, and interrupts the operation of the analysis system 100. The control computer 101 may restart or continue the conveyance processing of the remaining conveyance containers (specimen holders) 20 while avoiding the place where the abnormality has occurred.

Technical Effect of Conveyance System

If there is sufficient space to move the conveyance container 20 on the conveyance path composed of the plurality of conveying devices 1, the presence or absence of the conveyance container 20 on the conveyance surface is checked by the above method, and after drawing in or displaying a message to the system administrator, the conveyance processing can be continued or restarted.

As described above, in the analysis system 100 configured to connect a plurality of conveying devices 1 capable of detecting the position of the conveyance container 20 using the coil current (or the current flowing through the shunt resistor), even if a certain conveyance container 20 deviates to a position on the conveyance surface outside the conveyance path where the magnetic poles are not arranged or is stuck for some reason, it becomes possible to detect the presence or absence of the target conveyance container (specimen holder) 20 without using a dedicated container carrier detection device (position detection device), and to draw it onto the conveyance path or display a message to the system administrator, thereby making it possible to continue or restart the conveyance processing.

(4) Summary (i) In the conveying device 1 according to the present embodiment, the magnetic pole (first magnetic pole) selected for detecting the position of the conveyance container 20 is excited, a voltage is applied to at least one second magnetic pole that is the peripheral magnetic pole (see FIGS. 7 to 9) within a predetermined range from the first magnetic pole and is different from the first magnetic pole, in a direction in which the polarity becomes opposite to the exciting current of the first magnetic pole, and the position of the conveyance container is detected (estimated) based on the current value of the first magnetic pole. As a result, it is possible to improve the sensitivity to detect the presence or absence of the conveyance container 20 not only on the conveyance path but also in a place where magnetic poles are not arranged. The voltage applied to the peripheral magnetic pole can be a DC voltage or a pulse voltage in the direction in which the polarity becomes opposite.

Further, on the conveyance surface of the conveying device 1, magnetic poles are arranged in a number smaller than the number that can be arranged. For example, the conveyance surface can be configured to arrange a plurality of magnetic poles 25 in a grid pattern.

(ii) As shown in FIG. 13, the analysis system (may be referred to as a conveyance system) 100 according to the present embodiment includes a plurality of analysis devices 102, a plurality of conveying devices 1 arranged between the plurality of analysis devices, and a control computer 101 for controlling the operation of the analysis devices 102 and the conveying devices 1. In such an analysis system 100, a control operation of the system including position detection processing is executed according to the flowchart of FIG. 15.

In the analysis system 100, first, the processor of each conveying device 1 determines whether or not the conveyance container 20 has deviated from the selected magnetic pole (whether or not the conveyance container 20 has deviated from the conveyance path) based on the current change value when the exciting current is passed through the selected magnetic pole according to the above-mentioned basic principle, and the determination result (in the case of no deviation: to determine that the system operation is normal; in the case of deviation: to proceed to the next operation) is notified to the control computer 101. This makes it possible to sensitively determine whether or not the conveyance container 20 is on the conveyance path without using a dedicated container carrier detection device.

Further, in the analysis system 100, when it is determined that the conveyance container 20 has deviated from the selected magnetic pole (conveyance path), the drive unit 50 (coil drive unit 205) is controlled so that the conveyance container 20 around the selected magnetic pole is moved to the position of another magnetic pole. Alternatively, when the conveyance container 20 has deviated from the selected magnetic pole, the drive unit 50 may be controlled so that the conveyance container around the selected magnetic pole is moved to another conveying device 1. This makes it possible to secure a space in which the target conveyance container 20 can move on the conveyance path.

Further, in the analysis system 100, the first magnetic pole selected for detecting the position of the conveyance container 20 is excited, and a voltage is applied to at least one second magnetic pole that is the peripheral magnetic pole within a predetermined range from the first magnetic pole and is different from the first magnetic pole, in a direction in which the polarity becomes opposite to the exciting current of the first magnetic pole. As a result, it is possible to determine the presence or absence of the conveyance container 20 at a position where the magnetic poles are not arranged (outside the conveyance path). Then, the control computer 101 determines the processing stop, processing restart, and processing continuation in the analysis system 100 based on the determination result.

(iii) The present disclosure is not limited to the above-described embodiments and includes various modifications. For example, the above-described embodiment is specifically described in order to explain the present disclosure in an easy-to-understand manner and is not necessarily limited to the one having all the described configurations. Further, it is possible to replace apart of the configuration of one embodiment with apart of the configuration of another embodiment. It is also possible to add the configuration of another embodiment to the configuration of one embodiment. Further, it is also possible to add, delete, or replace a part of another configuration with respect to a part of the configuration of each embodiment.

The present disclosure can also be embodied by a program code of software that implements the functions of the embodiment. In this case, a storage medium in which the program code is recorded is provided to the system or device, and the computer (or CPU or MPU) of the system or device reads out the program code stored in the storage medium. In this case, the program code itself read from the storage medium implements the function of the above-described embodiment, and the program code itself and the storage medium storing the program code itself configure the present disclosure. Examples of the storage medium for supplying such a program code include a flexible disk, a CD-ROM, a DVD-ROM, a hard disk, an optical disk, a magneto-optical disk, a CD-R, a magnetic tape, anon-volatile memory card, a ROM, and the like.

Further, based on the instruction of the program code, the OS (operating system) or the like running on the computer performs a part or all of the actual processing, and the functions of the above-described embodiment may be implemented by the processing. Further, after the program code read from the storage medium is written in the memory on the computer, the CPU of the computer or the like performs a part or all of the actual processing based on the instruction of the program code, and the functions of the above-described embodiment may be implemented by the processing.

Further, by distributing the program code of the software that implements the functions of the embodiment via the network, the program code may be stored in a storage means such as a hard disk or a memory of the system or device, or a storage medium such as a CD-RW or a CD-R, and the computer (or CPU or MPU) of the system or device may read and execute the program code stored in the storage means or the storage medium at the time of use.

Further, in the above-described embodiment, the control lines and information lines show what is considered necessary for explanation, and do not necessarily show all the control lines and information lines in the product. All configurations may be interconnected.

REFERENCE SIGNS LIST 1, 1A: conveying device
10: permanent magnet
21, 21a, 21b: coil
22: core
25, 25a, 25b: magnetic pole
30: current detection unit
40: calculation unit
50: drive unit
100: analysis system
101: control computer
102: analysis device
201: processor 202: memory
203: position detection unit
204: coil terminal
205: coil drive unit
206: input device
207: output device
208: bus
211: peripheral coil

The invention claimed is:

1. A conveying device that conveys a conveyance container including a magnet or a magnetic body to a target position along a conveyance path, comprising:
   a conveyance surface configured by arranging a plurality of magnetic poles including a core and a coil, and having a conveyance path;
   a drive unit for supplying a current to the coil; and
   a position detection unit for performing a process of estimating the position of the conveyance container, wherein
   the position detection unit performs:
      a process of exciting a first magnetic pole selected to detect the position of the conveyance container, and applying a voltage to at least one second magnetic pole that is a peripheral magnetic pole within a predetermined range from the first magnetic pole and is different from the first magnetic pole in a direction in which the polarity becomes opposite to the exciting current of the first magnetic pole, and
      a process of estimating the position of the conveyance container based on a current value of the first magnetic pole.

2. The conveying device according to claim 1, wherein the position detection unit applies a DC voltage or a pulse voltage to the second magnetic pole in the opposite polarity direction.

3. The conveying device according to claim 1, wherein a smaller number of magnetic poles than the number of magnetic poles that can be arranged are arranged on the conveyance surface.

4. The conveying device according to claim 3, wherein the plurality of magnetic poles are arranged in a grid on the conveyance surface.

5. An analysis system comprising a plurality of analysis devices, a plurality of conveying devices arranged between the plurality of analysis devices, and a control computer for controlling the operation of the analysis device and the conveying device, wherein
   each of the plurality of conveying devices is a conveying device that conveys a conveyance container including a magnet or a magnetic body to a target position along a conveyance path,
   and includes:
      a conveyance surface configured by arranging a plurality of magnetic poles including a core and a coil, and having a conveyance path,
      a drive unit for supplying a current to the coil, and
      a processor for performing a process of detecting the position of the conveyance container, and notifying the control computer of information based on the result of the position detection, and
   the processor determines whether or not the conveyance container has deviated from a selected magnetic pole based on a current change value when an exciting current flows through the selected magnetic pole, and notifies the control computer of the determination result.

6. The analysis system according to claim 5, wherein when the conveyance container deviates from the selected magnetic pole, the processor controls the drive unit to move the conveyance container around the selected magnetic pole to another magnetic pole position.

7. The analysis system according to claim 5, wherein when the conveyance container deviates from the selected magnetic pole, the processor controls the drive unit to move the conveyance container around the selected magnetic pole to another conveying device.

8. The analysis system according to claim 5, wherein the processor of the conveying device excites a first magnetic pole selected to detect the position of the conveyance container and applies a voltage to at least one second magnetic pole that is a peripheral magnetic pole within a predetermined range from the first magnetic pole and is different from the first magnetic pole in a direction in which the polarity becomes opposite to the exciting current of the first magnetic pole, to determine the presence or absence of the conveyance container at a position where the magnetic pole is not arranged and to notify the control computer of the determination result, and
the control computer determines processing stop, processing restart, and processing continuation in the analysis system based on the determination result from the conveying device.

9. The analysis system according to claim 8, wherein when the processor confirms the presence of the conveyance container at a position where the magnetic pole is not arranged, the processor controls the drive unit to draw the convey container into the conveyance path.

10. The analysis system according to claim 9, wherein the processor notifies the control computer of a result of the process of drawing the conveyance container into the conveyance path.

* * * * *